(12) United States Patent
Wyatt et al.

(10) Patent No.: US 11,091,876 B2
(45) Date of Patent: Aug. 17, 2021

(54) MOISTURE RESISTANT BIODEGRADABLE COMPOSITION

(71) Applicant: AUTOM RIVER INC., Toronto (CA)

(72) Inventors: Aubrey Bailey Morgan Wyatt, Toronto (CA); Thomas Jonathan Jackson Wyatt, Toronto (CA)

(73) Assignee: Autom River Inc., Toronto (CA)

( * ) Notice: Subject to any disclaimer, the term of this patent is extended or adjusted under 35 U.S.C. 154(b) by 753 days.

(21) Appl. No.: 15/668,772

(22) Filed: Aug. 4, 2017

(65) Prior Publication Data

US 2017/0328002 A1    Nov. 16, 2017

Related U.S. Application Data (63) Continuation-in-part of application No. PCT/CA2016/050087, filed on Feb. 2, 2016.

(60) Provisional application No. 62/111,943, filed on Feb. 4, 2015.

(51) Int. Cl.

| | |
|---|---|
| *A01M 1/20* | (2006.01) |
| *A01M 1/02* | (2006.01) |
| *D21H 11/02* | (2006.01) |
| *D21H 21/16* | (2006.01) |
| *A01M 1/10* | (2006.01) |
| *A01N 53/00* | (2006.01) |
| *D21H 11/12* | (2006.01) |
| *D21H 11/14* | (2006.01) |
| *D21H 17/06* | (2006.01) |
| *D21H 17/14* | (2006.01) |
| *D21J 3/10* | (2006.01) |

(52) U.S. Cl.
CPC ............... *D21H 11/02* (2013.01); *A01M 1/02* (2013.01); *A01M 1/10* (2013.01); *A01M 1/2005* (2013.01); *A01N 53/00* (2013.01); *D21H 11/12* (2013.01); *D21H 11/14* (2013.01); *D21H 17/06* (2013.01); *D21H 17/14* (2013.01); *D21H 21/16* (2013.01); *D21J 3/10* (2013.01)

(58) Field of Classification Search
CPC . A01G 9/029; A01M 1/106; A01M 2200/012; A01M 1/2005; A01M 1/10; A01M 1/02; D21H 11/02; D21H 21/16; D21H 17/14; D21H 17/06; D21H 11/14; D21H 11/12; D21J 3/10; A01N 53/00
USPC .................................. 43/131; 424/84; 47/66
See application file for complete search history.

(56) References Cited

U.S. PATENT DOCUMENTS

| | | | |
|---|---|---|---|
| 4,510,019 A | 4/1985 | Bartelloni | |
| 5,347,753 A * | 9/1994 | Dall | A01G 9/029 |
| | | | 47/65.7 |

(Continued)

FOREIGN PATENT DOCUMENTS

| | | |
|---|---|---|
| CA | 2799306 | 11/2001 |
| CA | 2434210 | 8/2002 |

(Continued)

OTHER PUBLICATIONS

Written Opinion of PCT/CA2016/050087—dated Apr. 18, 2016.
International Search Report of PCT/CA2016/050087—dated Apr. 18, 2016.

*Primary Examiner* — Ellen S Hock
(74) *Attorney, Agent, or Firm* — Gowling WLG (Canada) LLP; Susan Tandan (57) ABSTRACT

A biodegradable composition having resistance to moisture and organic waste is provided.

19 Claims, 9 Drawing Sheets

(56) References Cited

U.S. PATENT DOCUMENTS

| | | | | |
|---|---|---|---|---|
| 2005/0089606 A1* | 4/2005 | Dellinger | ............... | C08L 89/00 426/106 |
| 2006/0150473 A1* | 7/2006 | Bette | .................... | A01M 1/106 43/131 |
| 2006/0231223 A1 | 10/2006 | Ward et al. | | |
| 2007/0193706 A1* | 8/2007 | Kirov | ................ | D21C 11/0007 162/28 |

FOREIGN PATENT DOCUMENTS

| | | | |
|---|---|---|---|
| CA | 2434210 | A1 | 8/2002 |
| CA | 2799301 | | 5/2011 |
| CA | 2799306 | A1 | 11/2011 |
| CN | 103025615 | | 8/2008 |
| CN | 103025615 | | 9/2016 |
| JP | 2003321307 | | 11/2003 |
| KR | 20120021764 | | 3/2012 |
| KR | 101286229 | | 7/2013 |
| WO | 2007/027601 | A2 | 3/2007 |
| WO | 2011/094581 | | 4/2011 |
| WO | 2001/49938 | A1 | 7/2011 |
| WO | 2011094581 | | 8/2011 |
| WO | 2011/145073 | A1 | 11/2011 |
| WO | 2012/006325 | A2 | 1/2012 |

\* cited by examiner

MOISTURE RESISTANT BIODEGRADABLE COMPOSITION

FIELD

The present description relates to a moisture resistant biodegradable composition.

BACKGROUND

Temporary environmentally friendly storage of certain materials such as wet organic waste or water has associated with it a range of problems. Containers made of biodegradable materials may not sufficiently store the waste in that the organic waste may too quickly break down the container in which the waste is stored. Containers made of other materials may sufficiently store organic waste but may not adequately degrade themselves or may present with additional problems.

For example, compost containers are typically made of plastic or other water-resistant material. These compost containers must be able to effectively store organic waste while avoiding leakage. To facilitate transport of the compost from, for example, a kitchen compost bin to a larger organic waste collection, biodegradable liners such as bags are often used with compost containers. These bags or liners, however, are not immune to leakage from the liquid naturally resulting from the organic waste. Further, the bags do not always line the plastic compost bin properly, resulting in compost that is not always contained within the liner but spills onto the container walls which must be cleaned to avoid offensive odors and to maintain cleanliness.

Similarly, temporary environmentally friendly storage of water or other liquids has its own problems. Currently, plastic containers filled with water are used to control water-breeding insect populations such as mosquitoes. Certain insect populations are responsible for the spread of diseases, such as mosquito borne diseases, affecting humans across the world in tropical climates. Approximately 3.4 billion people are at risk of being infected by Malaria or Dengue with over 500,000 and 25,000 deaths attributed to these diseases, respectively, each year. Additionally, the recent Zika outbreak in Brazil associated with mosquito has prompted further investigation into vector control (i.e., killing mosquitoes).

Presently, plastic containers filled with water are used as mosquito traps in areas such as Australia to combat Dengue or Malaria. One hundred plastic traps may be used in response to a single infection. However, once the insecticide in the water-filled traps wears off, the plastic traps must be collected to avoid having the traps become a breeding pool for new mosquitoes. This collection process requires the use of resources to track the locations of the plastic bins and to subsequently collect these bins.

Given the foregoing, it would be desirable to develop a biodegradable moisture resistant composition for use in a variety of applications including as a disposable container suitable for use as a compost container.)

SUMMARY

A moisture resistant biodegradable composition is described herein.

According to an aspect of the present disclosure, a moisture resistant biodegradable composition is provided comprising a pulp component comprising between about 75% to about 100% wood-based fiber and optionally up to about 25% non-wood-based fiber, and a sizing agent in an amount of about 2% to 10% for every about 100 kg of the pulp component.

According to another aspect of the present disclosure, a moisture and waste resistant biodegradable composition is provided comprising a pulp component comprising about 90% double lined kraft corrugated scrap (DLK), about 10% newsprint, and alkyl ketone dimer (AKD) in an amount of about 6% for every 100 kg of the pulp component.

According to another aspect of the present disclosure, a container made of the above composition is provided.

According to another aspect of the present disclosure, a moisture resistant biodegradable insect trap is provided comprising a container as defined above which incorporates an insecticide.

In still another aspect of the present disclosure, a method of making the above container is provided comprising the steps of preparing the pulp component by blending about 75% to about 100% of wood-based fiber and optionally up to about 25% non-wood-based fiber; mixing a sizing agent into the pulp component in an amount of about 2% to about 10% for every about 100 kg of said pulp component to form the composition; and forming the composition into the shape of a container and allowing the composition to dry.

BRIEF DESCRIPTION OF THE DRAWINGS

These and other features of the disclosure will become more apparent from the following description in which reference is made to the appended drawings wherein.

DETAILED DESCRIPTION

According to an aspect of the present invention, a moisture resistant biodegradable composition is provided comprising between about 75% to about 100% wood-based fiber and optionally up to about 25% non-wood-based fiber to form a pulp component, and comprising a sizing agent in an amount of between about 2% to about 10% for every about 100 kg of the pulp component.

The wood-based fiber component of the composition may be obtained from any biodegradable wood-based fiber product. For example, the wood-based fiber component may be obtained, using procedures well-established in the art (e.g. macerating and blending) from various types of board prepared from wood pulp having a thickness of at least about 0.010 inches (or 10 points). Examples of suitable wood pulp-based boards for use include, but are not limited to, paperboard or cardboard, such as chipboard, kraft board, containerboard, bleached or unbleached paperboard, corrugated or uncorrugated. For example, the wood-based board component may be double lined kraft corrugated scrap (DLK). This wood-based fiber component can be obtained from waste paper. The wood-based fiber is present in the composition in an amount between about 75% to about 100% of the composition. In one embodiment, it is about 90% of the composition, for example, 90% DLK. In another embodiment, it is about 100% of the composition, for example, 100% DLK.

The non-wood-based fiber component of the composition may be obtained from waste paper. This non-wood-based fiber may be any biodegradable non-wood based fiber. For example, it may be based on agricultural residue such as straw. It may also be based on annual plants and grasses such as miscanthus, jute, bamboo, sorghum, switchgrass, kenaf, and hemp among others as will be known to one skilled in the art. This non-wood-based fiber may be obtained from any recycled paper that is not cardboard. For example, it may be newsprint as identified by particular recycling facilities. The non-wood-based fiber component may be used as is to make the present composition, without processing to provide it in fibrous form. The non-wood-based fiber component is present in the composition in an amount between about 0% to about 25% of the composition. In one embodiment, it is about 10% of the composition, for example, 10% newsprint.

The composition also includes a sizing agent in an amount between about 2% to about 10% for every about 100 kg of the pulp component. Preferably, an amount of about 4% to 8% of sizing agent is incorporated within the composition. The sizing agent may be any suitable sizing agent such as a basic or neutral sizing agent, e.g. alkyl succinic anhydride (ASA), alkene ketone dimer (AKD) or other wax-like chemicals known to one skilled in the art, or an acidic sizing agent, e.g. rosin and derivatives thereof. The sizing agent may also be a modified starch or hydrocolloid such as gelatin, or an acrylic co-polymer such as styrene acrylate or other polyacrylamides. In one embodiment, the composition comprises a sizing agent such as AKD in the amount of 6% for every about 100 kg of the pulp component formed by the wood-based fiber and non-wood-based fiber. In another embodiment, the composition comprises about 8% sizing agent (e.g. AKD) for every 100 kg of pulp component.

The composition may be made by combining the wood-based fiber and non-wood-based fiber and macerating the combination. It may also be made by macerating the wood-based fiber alone without the non-wood based fiber. Water may be added to turn the combination into a pulp slurry. For example, an industrial 'blender' may be used to macerate and blend the combination into a pulp slurry. After the slurry is created, a sizing agent is added in an amount of about 2% to about 10% for every about 100 kg of the pulp component to the pulp component and mixed to yield the present composition.

The composition may be formed into a desired shape for use. Accordingly, to mould the composition into a desired shape, a pulp moulding machine may be used. The composition is then formed into the desired shape by, for example, using appropriate moulds. The moulded composition is then dried, for example, on a conveyor belt that passes through a drying chamber such as an oven.

More particularly, containers from the present composition may be made on a pulp moulding machine using a two step moulding process. First, a female mould is provided that is perforated and covered in mesh whereby a vacuum can be applied to pull the present pulp composition into the female mould. The female mould is placed into a reservoir containing the composition, a vacuum is applied to pull composition into the mould, and the mould is removed from the slurry containing a coating of pulp composition that will become the final desired shape. A male mould designed to fit into the female mould may also be provided that is used as a wet press to further define the desired shape. Finally, excess moisture is removed from the shaped containers by drying, for example, in an oven.

As known to one skilled in the art, other moulding methods may also be employed. For example, the composition may also be moulded using thermoformed pulp moulding presses and other similar machinery common in the industry or any other method as known to one skilled in the art.

The composition maybe used in a variety of applications including biodegradable moisture resistant products, such as containers. Products made by this process are biodegradable over time while also providing moisture resistance properties to permit retention of moist or wet matter for limited periods of time without leakage, e.g. for at least about 1 week (7 days), preferably for at least about 2 weeks (14 days), and more preferably for at least 3 weeks (21 days) or longer. For example, a moisture resistant container is useful as a biodegradable container for organic waste, a biodegradable insect trap, a food container, a beverage container, or an indoor plant pot, among other uses. These biodegradable containers may be any suitable shape capable of holding a volume. For example, the container may have a circular cross-section and be of a generally frusta-conical shape, or the container may assume any other suitable shape, such as that of a square, rectangular, hexagonal or other cross-sectional shape.

Containers made with the present composition may additionally include a cover or lid to limit spills, to limit access to the contents of the container or to contain odours. To achieve these purposes, the lid or cover will advantageously correspond in shape to the open end of the container and be sized to fit snuggly thereon, either within the internal perimeter of the open-end of the container or snuggly about the outer perimeter of the open-end of the container. The lid may be made of the same or similar biodegradable composition as the container. Alternatively, the lid may be made of another material such as paper or, for example, a non-biodegradable material for re-use, e.g. such as a plastic material.

With respect to using the biodegradable container as an insect trap, for example, for water-breeding insects such as mosquitoes, bed bugs, wasps, centipedes, earwigs, and other insect pests, the containers made of the present composition may incorporate an insecticide, a larvicide, or both. The term "incorporate" is used herein with respect to inclusion of the insecticide in the present container, to refer to either a surface coating of the insecticide on the container, or combination of the insecticide directly within the composition prior to making of the container.

Thus, in one embodiment, the container may be coated on its internal surface, i.e. the surface of the container which comes in contact with the content of the container, with an insecticide, filled with water, and placed in an appropriate area. Any suitable insecticide may be used to target a given insect, such as but not limited to bifenthrin, permethrin or lambda-cyhalothrin (pyrethroids), organophosphates, such as malathion, Neonicotinoids such as imidacloprid, ryanoids, biological control agents such as *Bacillus thuringiensis*, organo chlorides, Insect Growth Regulators, Carbamates. Insecticide includes larvicides such as *Bacillus thuringiensis israelensis, Bacillus sphaericus*, Methoprene, Temephos, monomolecular films (e.g. Arosurf MSF and Agnique MMF) and oils (e.g. Bonide, BVA2, and Golden Bear-1111 (GB-1111)). The container is coated with an amount of insecticide which wets the container. One or more coats of insecticide may be used. In another embodiment, the container may be pre-treated with insecticide, e.g. soaked in insecticide.

Alternatively, the insecticide may be included directly in the composition used to make the container in an amount suitable to provide insecticidal/larvicidal activity. Such amounts are known to those of skill in the art. In still other embodiments, a small piece of fabric, a biodegradable composition, or other material soaked, coated, or otherwise treated with insecticide may be attached to the container to provide a landing or egg-laying zone for mosquitoes or other water-borne insects. Insecticide may be incorporated into the container in other ways known to one with skill in the art.

For use as an insect trap, the present container incorporating one or more insecticides, is filled with water and placed in an area having the target insect(s). Water-breeding insects are attracted to the stagnant water within the container. Contact with the insecticide on/in the container kills the insect. To improve the attraction of insects to the water, the water may be made more "stagnant" or "stale" by inclusion of stagnant-inducing materials, such as but not limited to, plant materials, e.g. grass or other plant cuttings, alfalfa meal, wheat shorts, soya hulls, corn gluten feed, soybean meal, tea leaves (e.g. in a tea bag), hay infusion, animal feed (e.g. for rodents or rabbits) and the like. Mosquito pheromones (e.g. octenol) may also be used, as well as gases, such as $CO_2$.

The present container provides a number of advantages in its use as an insect trap. Not only is it relatively straightforward and inexpensive to make, the fact that it is biodegradable permits its use outdoors to kill target insects, in an environmentally favourable way. After a certain period of time, the container will simply decompose. Thus, additional resources are not required to collect and dispose of used insect traps.

Embodiments of the present invention are described by reference to the following specific examples which are not to be construed as limiting.

Example 1: Method for Making a Biodegradable Container

The biodegradable containers referenced in Table 1 were created from a pulp slurry formed by maceration and blending of the wood-based fiber and non-wood-based fiber in water. A sizing agent was then mixed into the slurry to give the final product a moisture-resistance property. The slurry was then formed into a container using a pulp moulding machine in a two step moulding process. A perforated female mould was provided covered in mesh. The female mould was then placed into the slurry, a vacuum applied, and the mould was then removed from the slurry containing a coating of pulp that would become the container. A male mould was also provided and used as a wet-press to further define the container. Finally, the containers were ejected onto a conveyor belt that entered into an oven to remove excess moisture from the container.

Example 2: Containers with Organic Waste

An organic waste resistance test was conducted in which organic ingredients were mixed within pulp containers of varied compositions. The organic ingredients included: 1 cup cooked rice, 1 cup coffee grinds, ½ cup crushed tomatoes, 1 banana and peel, and water for the balance so that it reached the top of each container. About 10 containers of each composition were observed in a home industrial compost tumbler (home compost pile) for a period of about six (6) weeks. Similarly, about 5 containers of each composition were observed in an industrial compost facility (industrial compost pile comprising aerobic tunnels) for a period of about two (2) weeks.

First Container Composition: A pulp container was used with the following composition: approximately 50% DLK and approximately 50% newsprint with approximately 4% AKD added as a sizing agent (Fennosize KD 266 MB NA, Kemira®).

Second Container Composition: A pulp container was used with the following composition: approximately 90% DLK and approximately 10% newsprint with approximately 8% AKD.

Third Container Composition: A pulp container was used with the following composition: approximately 100% DLK and approximately 8% AKD.

Fourth Container Composition: A pulp container was used with the following composition: approximately 90% DLK with approximately 10% No 9 Newsprint, pulped to 98% dilution with water, and approximately 6% AKD. The pulping time was 18 minutes and was produced with Type II moulded fibre production line.

The AKD in all tested compositions was Fennosize KD 266 MB NA, Kemira®.

The results of the organic waste resistance test are shown in Table 1, including an indication of the time within which the container degraded (e.g. to the point of leaking) and other observations.

TABLE 1

Time for Degradation of Container in the Presence of Wet Organic Waste in a Home Compost Pile and an Industrial Compost Pile

| Container Composition | Wet Waste Resistance in a Home Compost Pile | Wet Waste Resistance in a Industrial Compost Pile | Other Observations |
|---|---|---|---|
| 50% DLK; 50% newsprint; 4% AKD | 1-2 days | 1-2 days | |
| 90% DLK; 10% newsprint; 8% AKD | 7 days | 7 days | Container degraded in about 10 days |
| 100% DLK; 8% AKD | 7 days | 7 days | Definition of the container was reduced after 7 days |

TABLE 1-continued

Time for Degradation of Container in the Presence of Wet Organic Waste in a Home Compost Pile and an Industrial Compost Pile

| Container Composition | Wet Waste Resistance in a Home Compost Pile | Wet Waste Resistance in a Industrial Compost Pile | Other Observations |
|---|---|---|---|
| 90% DLK; 10% newsprint pulped to 98% dilution with water; 6% AKD | 2 weeks | 7 days | Container degraded in about 12 days |

Example 3: Biodegradability in Field

The biodegradability of the containers was tested in the field. The following container composition was used, 100% DLK+8% AKD. The containers were filled with water to one inch of the top of the container and left in a garden bed in a natural environment.

Within two weeks of exposure, beads of water were present on the outsides of the biodegradable container. Within three weeks of exposure in the garden bed, the underside of the containers had softened considerably. Within three weeks of exposure in the garden bed, plant roots were evident underneath the container searching for moisture.

Example 4: Disintegration Evaluation in a Pilot-Scale Aerobic Composting Test An exemplary water-resistant biodegradable container as used in Example 3, having a thickness of approximately 2.7 mm and grammage of approximately 819 g/m², was evaluated for disintegration in a pilot-scale aerobic composting test. The exemplary frusto-conical container had an approximate height of 14.6 cm, maximum diameter of approximately 21.7 cm, and minimum diameter of approximately 14.2 cm. The purpose of the test was to simulate as closely as possible a real and complete composting process in pilot-scale composting bins of 200 L. The exemplary container was cut into eight pieces for evaluation of disintegration. A portion of the container along with a paper lid was also milled to form a milled material. The cut pieces formed approximately 1% and the milled material formed approximately 9% of the material to be tested for disintegration. This test material was added to biowaste and introduced into an insulated composting bin after which composting spontaneously begins. The biowaste comprised a Vegetable, Garden, and Fruit (VGF) mixture and structural material. Control and testing bins were filled to the top with the biowaste which had characteristics as shown in Table 2.

TABLE 2

Characteristics of Biowaste in Control and Test Bins

| Characteristics | Biowaste in Control Bin | Biowaste and Test Material in Test Bin |
|---|---|---|
| Total solids (TS, %) | 27.5 | 33.5 |
| Moisture content (%) | 72.5 | 66.5 |
| Volatile solids (VS, % on TS) | 82.0 | 84.5 |
| Ash content (% on TS) | 18.0 | 15.5 |
| Total N (g/kg TS) | 19.5 | 15.0 |
| C/N | 21 | 28 |

Figure 1:
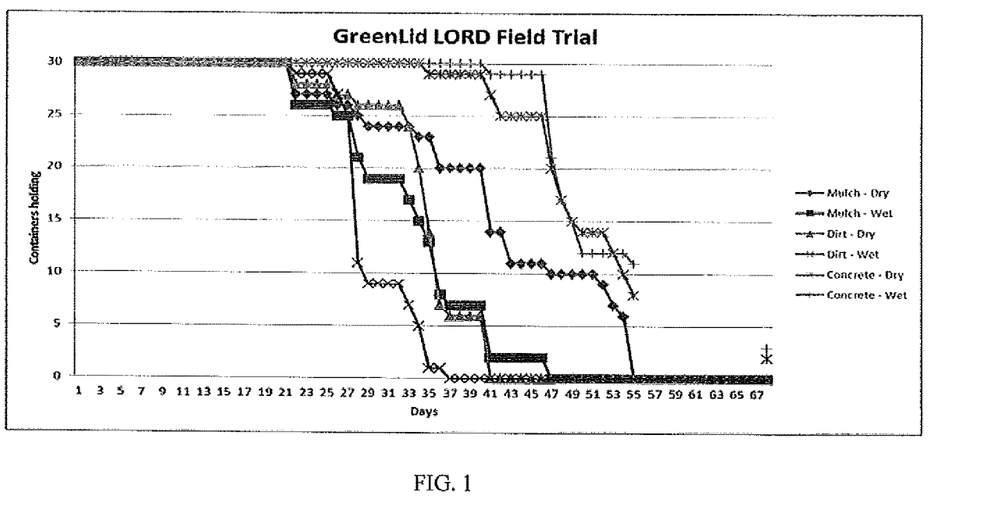
FIG. 1 is a chart showing the water holding capability of an exemplary biodegradable container over an approximately nine-week period.
Figure 2:
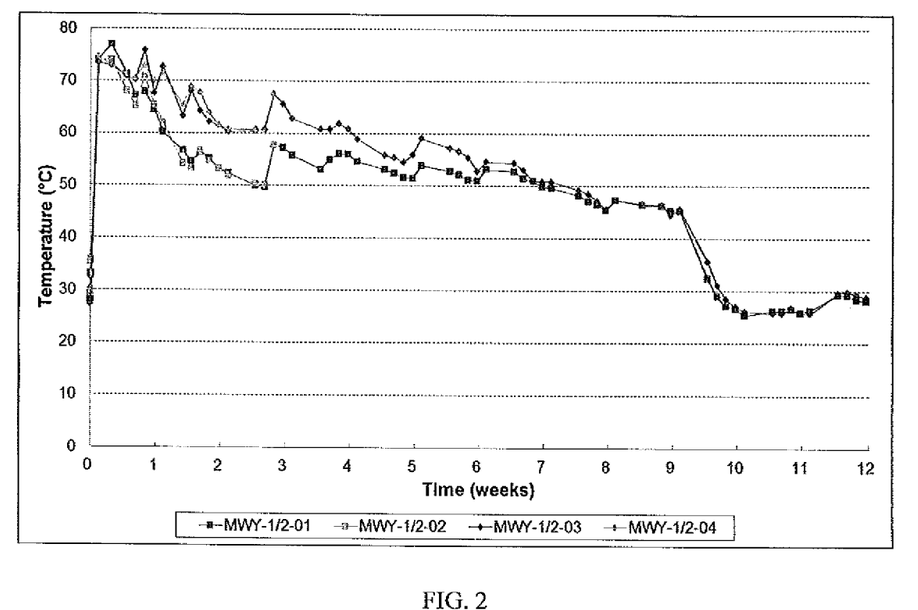
FIG. 2 is a chart showing the temperature evolution in test and control bins during a composting test.
Figure 3:
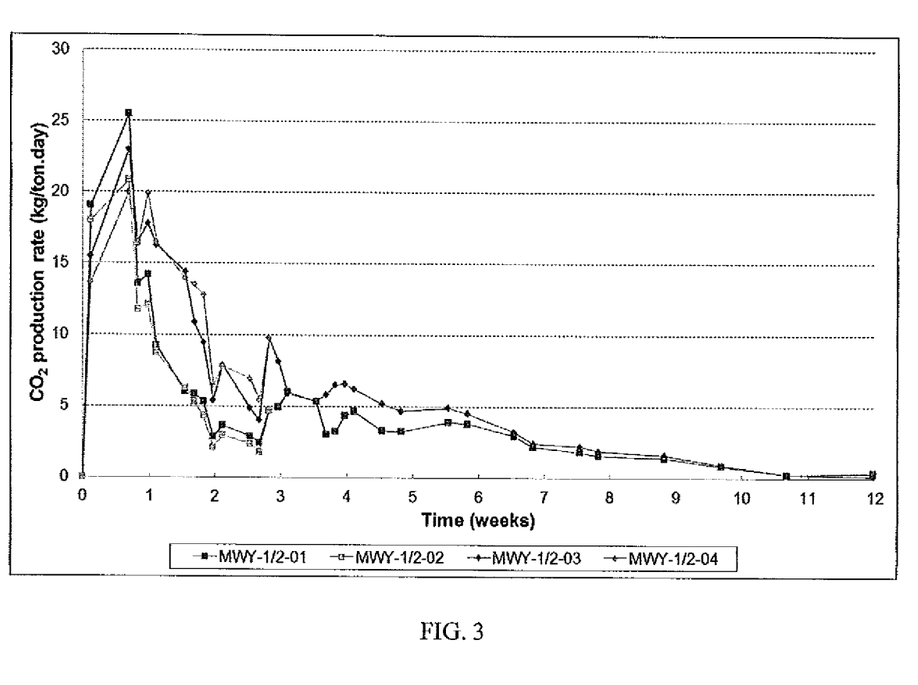
FIG. 3 is a chart showing $CO_2$ production rate during the composting test referenced in FIG. 2.
Figure 4:
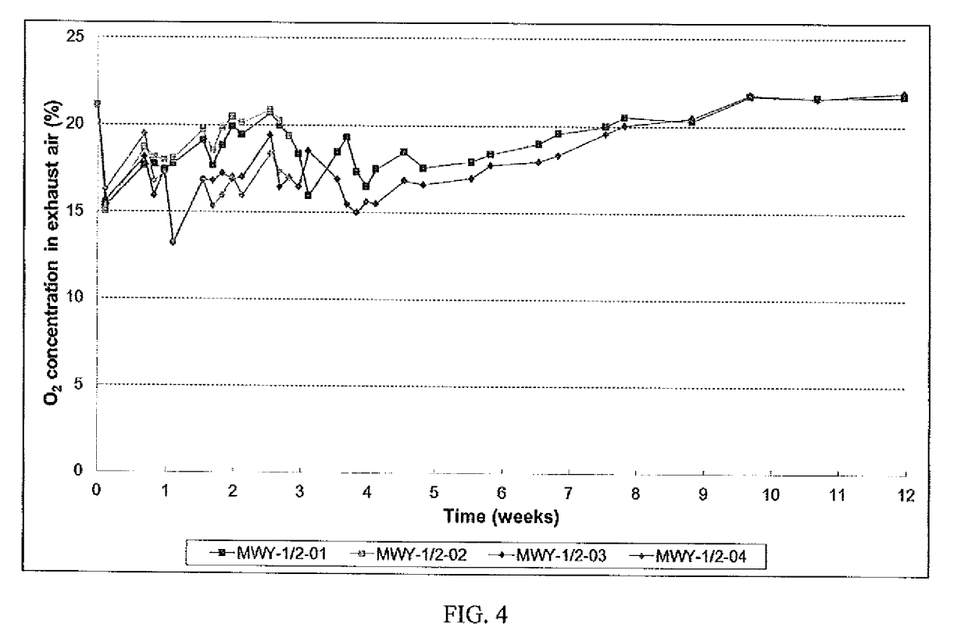
FIG. 4 is a chart showing $O_2$ concentration in exhaust air during the composting test referenced in FIG. 2.
Figure 5:
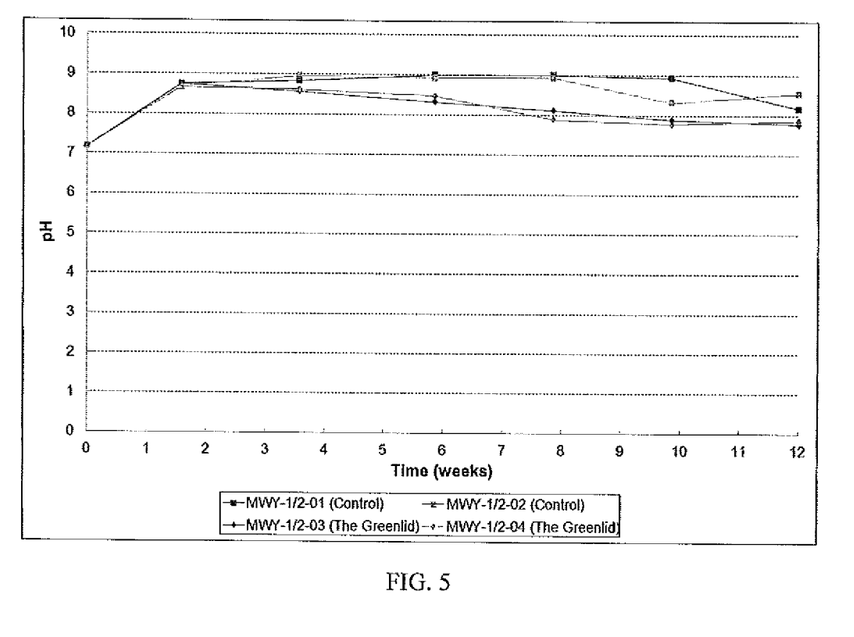
FIG. 5 is a chart showing the pH evolution in test and control bins during the composting test referenced in FIG. 2.
Figure 6:
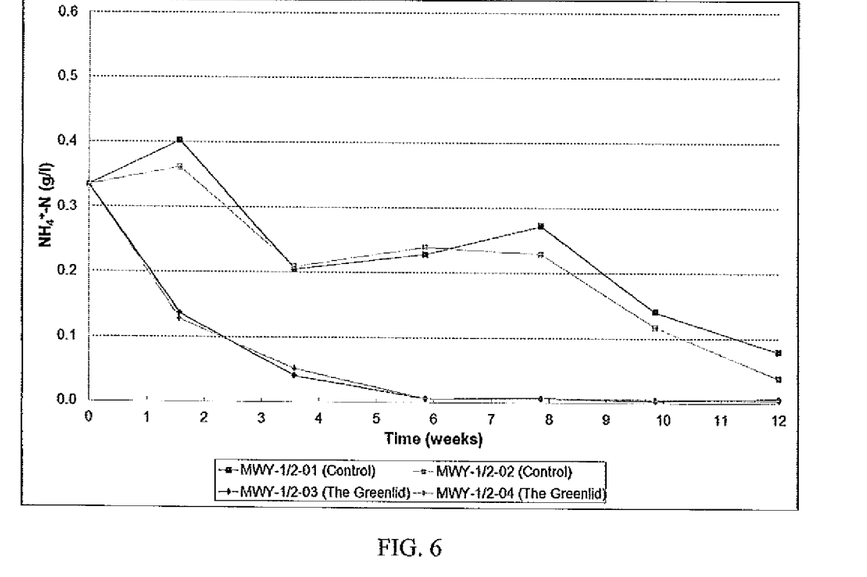
FIG. 6 is a chart showing the trend in $NH_4^+$—N in test and control bins during the composting test referenced in FIG. 2.
Figure 7:
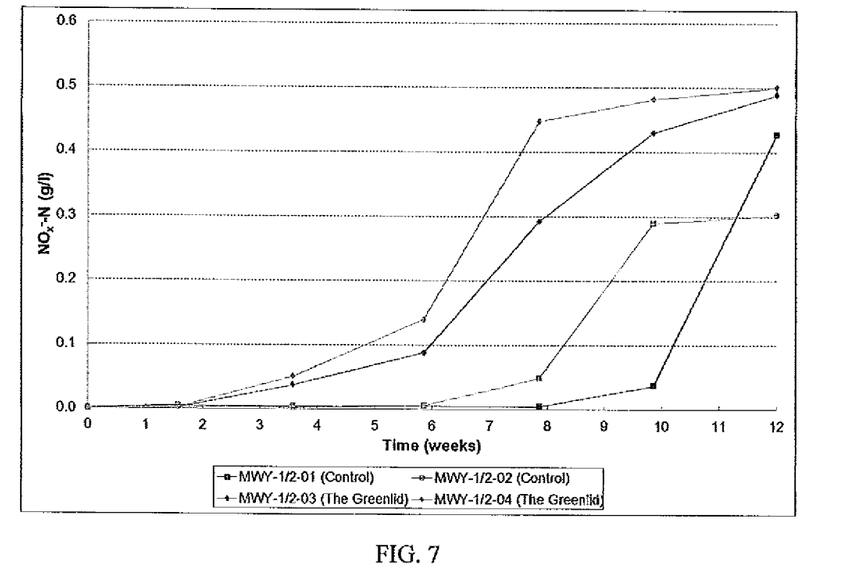
FIG. 7 is a chart showing the trend in $NO_x^-$—N in test and control bins during the composting test referenced in FIG. 2.
Figure 8:
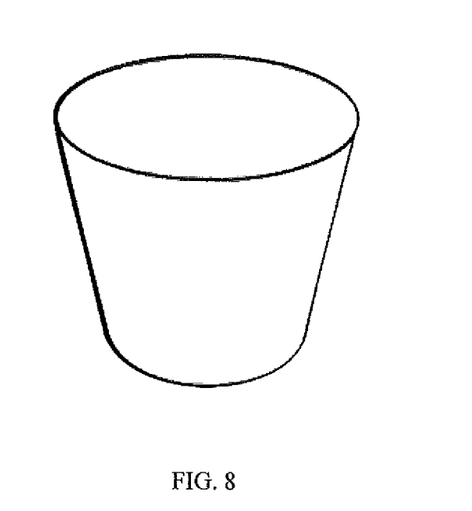
FIG. 8 is a top perspective view of an exemplary container having a frusto-conical shape.

As can be seen in FIGS. 2-4, the temperature evolution, $CO_2$ production, and $O_2$ concentration in the exhaust air of the Test Bins (labeled MWY-1/2-03 and MWY-1/2-04) closely tracked that of the Control Bins (labeled MWY-1/2-01 and MWY-1/2-02). Similarly, as can be seen in FIGS. 5-7, the pH evolution, Ammonium-Nitrogen ($NH_4^+$—N), and Nitrate and nitrite-nitrogen ($NO_x^-$—N) trends of the Test Bins generally followed the upward or downward trends of the Control Bins.

At the end of twelve weeks, the compost in the Control Bins and Test Bins was stable and mature, demonstrated by a Rottegrad of V as measured on the <10 mm fraction. Additionally, none of the bins had volatile fatty acids. A normal average pH of 8.4 and 7.8 was measured for the Control Bins and Test Bins, respectively. Lower salt levels were found in the Test Bins (2390 μS/cm) when compared to the Control Bins (3000 μS/cm) which is beneficial for compost quality. Additionally, low $NH_4^+$—N levels were obtained and an increase in the $NO_x^-$N content was observed for the Test and Control Bins. The increase in the $NO_x^-$N content to an average of 65 mg $NO_x^-$N/l for the Control Bins and 495 mg $NO_x^-$N/l for the Test Bins indicates the nitrification process had started and was proceeding well.

Finally, a rather comparable average N content was found for the Control and Test Bins, while a somewhat higher P, K, and Mg content was observed for the Control Bins.

Example 5: Biodegradable Mosquito Traps

The biodegradable container has also been used in the context of a mosquito trap. For example, containers made with the composition, 100% DLK and 8% AKD, were field tested. One hundred and eighty (180) containers having the above composition and a frusto-conical shape were filled with water to within 1 inch of the top of the container and placed on various substrates. These substrates existed in duplicate in a dry zone which remained protected from water other than what was in the container, and a wet zone where the substrate was watered every few days to simulate rain. Thus, 90 containers were in the dry zone and 90 containers were in the wet zone. Three substrate types were used as follows: mulch, soil/dirt, and concrete. Thus, 30 containers were placed on each substrate in each zone.

Prior to filling with water, the internal surface of the containers was coated with a pesticide, either 0.1% bifenthrin (a pyrethroid), or Lambda-cyhalothrin to kill mosquitoes. A non-pesticide control group was also present in each substrate and zone as indicated above. Other pesticide equivalents may also be used. The containers were coated with the pesticide by spraying the internal surface of the containers. Thus, each substrate in each zone had 10 containers coated with 0.1% bifenthrin, 10 containers coated with Lambda-cyhalothrin, and 10 containers that remained uncoated. All containers were then observed over approximately a 9 week period to determine their water holding capability over that period.

Figure 9:
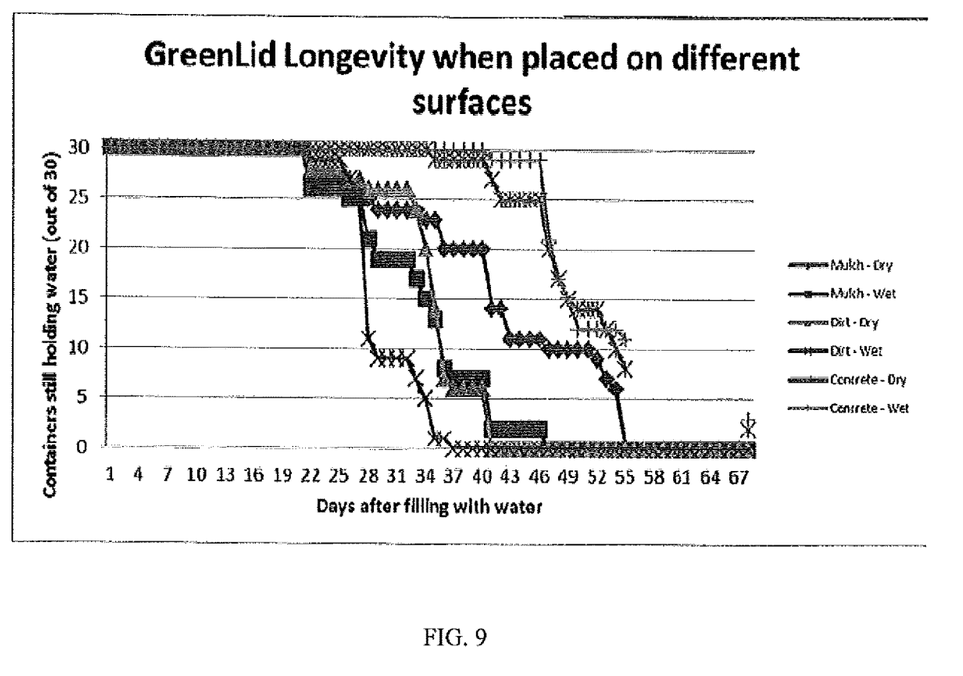
FIG. 9 graphically illustrates the longevity of insecticide-coated containers in accordance with an embodiment of the invention on different surfaces.

FIG. 9 is a chart showing the containers' water holding ability over an approximately 9 week period on the various substrates in both the dry and wet zones. As shown in the chart, all thirty containers on all substrates and in both the dry and wet zone held water for at least approximately 21 days or three weeks. Not surprisingly, the containers on the concrete substrate in the dry zone held water for a longer period. For example, the first container on the concrete substrate in the dry zone held water for about 37 days (a little over 5 weeks), whereas the first container on the concrete substrate in the wet zone held water for about 41 days (almost 6 weeks).

All containers on the wet soil substrate held water for about 37 days. All containers in the dry soil substrate held water for about 41 days. All containers in the wet mulch substrate held water for about 47 days, whereas all containers in the dry mulch held water for about 55 days. At 9 weeks, two containers remained on the dry concrete and three containers remained on the wet concrete.

The biodegradable containers also successfully functioned as a mosquito trap. For example, containers were double sprayed with lambda-cyalothrin, filled with water and placed in a closed area with a known number of mosquitoes. After about 4 weeks, mosquito mortality was measured by counting the number of live mosquitoes compared to the dead mosquitoes. 100% mosquito mortality was achieved.

Example 6: Biodegradable Mosquito Traps

The biodegradable container having the composition described in Example 3 and having the following characteristics: weight: 65 g, total volume: 3.5 L, working volume: 2.5 L, diameter: 8.5 inches and height: 6 inches, was used as a mosquito trap in this study. The container contained as mosquito bait a 2 g tea bag containing: alfalfa meal, wheat shorts, soya hulls, corn gluten feed, soybean meal, brewer's yeast, vitamins and minerals (NOTE: pls provide amounts, and the vitamins and minerals used—do you believe this to be patentable?)

Permethrin was sprayed evenly onto the interior of each biodegradable container (~25-50 mg per container, according to the recommended manufacture concentration).

The following studies summarize the results of using this paper-based biodegradable mosquito trap.

Degradation Studies—In order to determine effectiveness of the present containers at holding water in various conditions, including covered, uncovered and on various surfaces including concrete, mulch and soil, an experiment was conducted over a 60 day period in Queensland. Thirty of the biodegradable containers filled with water were placed on concrete, mulch, and soil, either covered (wet) or uncovered (dry) by a tent to protect from rain. Each day, the containers were inspected to see if water was still present. After 21 days, the containers that were on the dirt and mulch, both dry and wet, began to degrade. This was likely due to contact of microorganisms in the mulch and soil, along with a greater concentration of insects that may cause an increased degradation rate of the biodegradable container. By week 6, 50% of the containers for all surfaces and wet/dry exposures had lost their water. All containers lost their water by day 55 as shown in FIG. 9.

Figure 10:
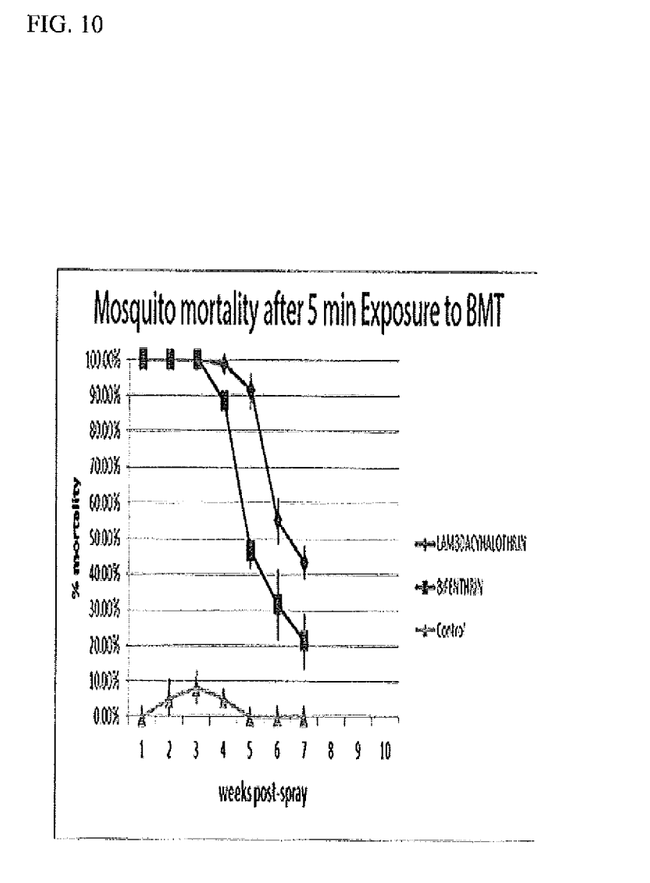
FIG. 10 graphically illustrates the effectiveness of insecticide-coated containers were filled with water to kill mosquitoes.

Field Degradation and Laboratory Efficacy Studies— While monitoring degradation of the present containers holding water, the efficacy of the pyrethroid insecticide coating the inside of the containers was also monitored to ensure that the containers remained active as mosquito traps during the time that they held water. During the 60 day experiment, once a week, a sample container still holding water was removed from the outdoors and brought into the laboratory to test its efficacy against *Aedes aegypti* mosquitoes. The container was placed in a small enclosed chamber and 10 mosquitoes were released into the chamber. Mosquito mortality was monitored after landing on the trap. Results are shown in FIG. 10. After 4 weeks the containers remained effective and by the end of 8 weeks, the containers had lost efficacy, corresponding to the degradation of the pyrethroid insecticide, and the degradation of the biodegradable trap themselves.

After successfully linking the degradation of the present containers (referred to below as "Biotraps" to the failure of the biodegradable containers to hold water, it was determined whether or not the containers could replace the current plastic lethal Ovitraps™ in the field to reduce widespread mosquito populations.

Field Tests—Two Field tests were conducted, one in Itacoatiara, Brazil in the state of Amazonas over a period of 3 months, and the second was carried out in Monroe County, Pa., USA. Both trials took place in areas that had previous mosquito population data and were carried out by seasoned vector control professionals.

Itacoatiara was chosen as an ideal field test site due to the extensive mosquito population data that has been collected in the area over the previous 2 years and due to the extensively trained team in monitoring mosquito populations. The primary mosquitoes present in Itacoatiara are of the *Aedes* genus (*Aedes aegypti* and *Aedes albopictus*). Two neighbourhoods of Itacoatiara were selected for testing that had similar areas and mosquito populations as determined over the previous 12 months. Each neighbourhood was ~100 hectares (~247 acres) spanning approximately 12 square blocks, with approximately 80 homes per block.

Twelve Ovitraps™ were used for each site, spread at equal intervals through each of the 1 $km^2$ test sites. The Ovitraps™ were left for 24 hours to collect eggs from female mosquitoes within the area. They were then re-collected and eggs were counted to determine relative mosquito population of adult mosquitoes. At the same time, Biotraps (i.e. the present insecticide-coated containers as described above) were put in place, and replaced every 4 weeks to continue on-going treatment of the site.

Figure 11:
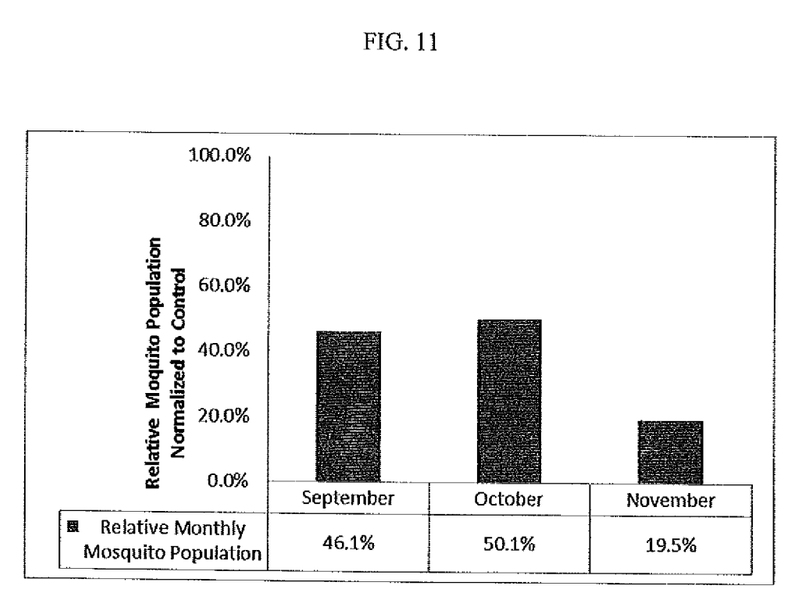
FIG. 11 graphically illustrates the weekly mosquito population at a site treated using a pesticide-coated container of an embodiment of the invention in comparison to control sites, each in Itacoatiara, Amazonas, Brazil.

Results are shown in FIG. 11. Relative mosquito population was determined by normalizing mosquito populations to the control sites. In order to normalize for weather conditions, which ultimately affect mosquito populations (wet=increase in mosquito breeding), mosquito population changes were normalized at the control site. This was done by determining the change of mosquito populations at the control site, and factoring this into the normalization at the test sites. Results showed an immediate decrease in mosquito population of 53.9% after just one month of treatment with the present Biotraps, and a decrease in the population of mosquitoes by over 80% relative to the untreated control sites after a 3 month period of time.

Consultations with lead scientists and vector control agents confirms that the present Biotraps are a cost-effective method to limit mosquito populations, in particular, around homes and areas that are difficult to treat with fogging or spraying of insecticide due to inability to access private areas or backyards.

Trials of the present Biotraps were also conducted in Monroe County, Pa., where the primary mosquito populations were of the *Culex* genus. The trials were carried out by the Monroe County Vector Control Unit. Monroe County had continuous mosquito population data from the previous 2 years. The trial was carried out as in the Brazilian trial described above with 100 Biotraps deployed in ~1 km² of terrain. Mosquito populations were monitored once every week using a BG-Sentinel™ Trap as directed. BG-Sentinel traps were deployed in the same position every week (near a woodland area including a creek, flat terrain, residential and recreational areas) and collected nearby adult mosquitoes for 24 hours. Adult mosquitoes were counted and identified by Pennsylvania state taxonomists. Two control sites were used to normalize for fluctuations in mosquito populations, Manwalamink WWTP (a wooded area on flat terrain with small to moderate hills and a nearby creek), and Glen Park (a wooded recreational area with a nearby residential area).

Figure 12:
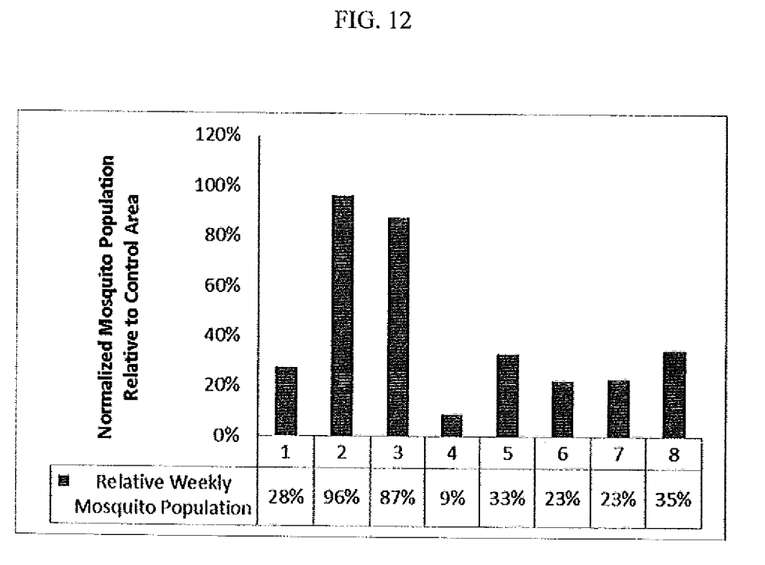
FIG. 12 graphically illustrates the weekly mosquito population at a site treated using a pesticide-coated container of an embodiment of the invention in comparison to control sites, each in Monroe County, Pa.

The trials were carried out for 8 weeks beginning in August and conducted until temperatures dropped to a point where mosquito populations began to diminish. Biotraps were replaced after 4 weeks (1 month) similar to the trials in Itacoatiara. Results are shown in FIG. 12. Relative mosquito population was determined by normalizing mosquito populations to the control sites. In order to normalize for weather conditions, which ultimately affect mosquito populations (wet=increase M mosquito breeding), mosquito population changes at the control site were also normalized by determining the change of mosquito populations in the control sites, and factoring this into the normalization at the test sites. Immediate decrease in mosquito populations can be seen after just 1 week. Due to increased rain and water in subsequent weeks 2 and 3, eggs that were previously laid by female mosquitoes hatched and increased mosquito populations immediately following the wet weather. However, after these subsequent hatchings, the present Biotraps quickly worked to reduce the mosquito population by over 90% and, in the subsequent 4 weeks, maintained a reduction of at least 65% in the mosquito population compared to control sites despite increased rain in later weeks. Overall, the trials in Monroe County demonstrate the effectiveness of the present Biotraps to reduce the population of the *Culex* Genus of mosquito in a temperate climate.

It is noted that permethrin is not phytotoxic, or poisonous to most plants, when it is used as directed. No incompatibility has been observed with permethrin on cultivated plants. Treated apples, grapes, and cereal grains contain less than one mg/kg of permethrin at harvest time.

One or more currently preferred embodiments have been described by way of example. It will be apparent to persons skilled in the art that a number of variations and modifications can be made without departing from the scope of the invention as defined in the claims.

References referred to herein are incorporated by reference.

What is claimed is:

1. A moisture resistant biodegradable insect trap consisting of a container incorporating an insecticide in an amount suitable to provide insecticidal or larvacidal activity, wherein said container is prepared from a composition comprising:
    a pulp component comprising between about 75% to about 100% wood-based fiber and optionally up to about 25% non-wood-based fiber; and
    a sizing agent, wherein said sizing agent is in an amount of about 2% to about 10% for every about 100 kg of said pulp component,
wherein said container is able to retain water for at least 1 week, and wherein the insecticide is applied as a coating on the container.

2. The insect trap of claim 1, wherein the wood-based fiber is obtained from corrugated or uncorrugated chipboard, kraft board, containerboard or bleached or unbleached paperboard.

3. The insect trap of claim 2, wherein the wood-based fiber is from corrugated kraft board.

4. The insect trap of claim 1, wherein the non-wood-based fiber is obtained from grasses selected from miscanthus, jute, bamboo, sorghum, switchgrass, kenaf, and hemp, recycled paper or newsprint.

5. The insect trap of claim 4, wherein the non-wood-based fiber is newsprint.

6. The insect trap of claim 1, wherein the sizing agent is included in an amount of from about 4% to 8%.

7. The insect trap of claim 1, wherein the sizing agent is a basic or neutral sizing agent.

8. The insect trap of claim 7, wherein the sizing agent is selected from the group comprising of: alkene ketone dimer (AKD) and alkyl succinic anhydride (ASA).

9. The insect trap of claim 1, wherein the sizing agent is AKD.

10. The insect trap of claim 1, wherein the pulp component comprises about 90% double lined kraft corrugated scrap (DLK) and about 10% newsprint; and-the sizing agent is alkyl ketene dimer (AKD) in an amount of about 6% for every about 100 kg of said pulp component.

11. The insect trap of claim 1, wherein said wood-based fiber is double lined kraft corrugated scrap (DLK).

12. The insect trap of claim 1, wherein said insecticide is selected from pyrethroids, organophosphates, organochlorides, neonicotinoids, ryanoids, biological control agents, insect growth regulators, carbamates, larvicide, monomolecular films, and oils.

13. The insect trap of claim 12, wherein said insecticide is selected from: bifenthrin, permethrin, lambda-cyhalothrin, malathion, imidacloprid, *Bacillus thuringiensis, Bacillus thuringiensis israelensis, Bacillus sphaericus*, methropene pyrethroids, organophosphates, organochlorides, neonicotinoids, ryanoids, biological control agents, insect growth regulators, carbamates, larvicide, monomolecular films, and oils, and temephos.

14. The insect trap of claim 1, wherein the pulp component comprises about 100% double lined kraft corrugated scrap (DLK); and about 8% AKD for every about 100 kg of said pulp component.

15. The insect trap of claim 1, provided with a stagnant-inducing material.

16. A method of making an insect trap as defined in claim 1, comprising the steps of:
    i) preparing the pulp component by blending about 75% to about 100% of wood-based fiber and optionally up to about 25% non-wood-based fiber;
    ii) mixing a sizing agent into the pulp component in an amount of about 2% to about 10% for every about 100 kg of said pulp component to form the composition; and
    iii) forming the composition into the shape of a container and allowing the composition to dry; and
    iv) coating the container with insecticide in an amount suitable to provide insecticidal or larvacidal activity.

17. The method of claim 16, wherein the inside of the container is coated with the insecticide.

18. The insect trap of claim 1, wherein the inside of the container is coated with the insecticide.

19. The insect trap of claim 12, wherein the insecticide is selected from a pyrethroid, an insect growth regulator and a larvicide.

\* \* \* \* \*